Patented Feb. 6, 1945

2,368,723

UNITED STATES PATENT OFFICE 2,368,723

DYEING OF CELLULOSE DERIVATIVES WITH NITRO DYES

Henry Charles Olpin and Christopher Stanley Argyle, Spondon, near Derby, England, assignors to Celanese Corporation of America, a corporation of Delaware No Drawing. Application April 22, 1942, Serial No. 440,114. In Great Britain June 24, 1941

12 Claims. (Cl. 8—57)

This invention relates to improvements in the manufacture of dyes and in the colouration therewith of textile and other materials, and particularly of materials containing fibres of organic derivatives of cellulose, i. e. cellulose esters of organic carboxylic acids or cellulose ethers.

In accordance with the invention valuable nitro-diarylamine dyes are obtained by forming an amide or an ester of a nitro-diarylamine carboxylic acid. Further, in accordance with the invention, textile and other materials, especially materials of an organic derivative of cellulose, are coloured by applying thereto a nitro-diarylamine carboxylic amide or ester. Of special value are the nitrodiphenylamine carboxylic amides and esters.

The present invention also includes the dyes themselves, dyed materials obtained with the aid of such dyes, and also compositions containing the dyes together with other substances, e. g. dispersing agents.

The dyes of the invention possess good fastness properties, and, in particular, are generally resistant to steaming. They are, therefore, of special value for printing and broadly for application to materials which are subsequently to be subjected to a steaming treatment.

Advantageously, the nitro group and the carboxylic amide or the carboxylic ester group are present in the same aromatic nucleus. Again it is of advantage that the nitro group should be in the ortho position to the amino group. The dyes may contain other substituents, e. g. cyano, halogen, alkyl, alkoxy, oxyalkyl, oxyalkoxy, alkylsulphone, sulphonamide, acetylamino, aryl-amino or additional nitro groups. Furthermore, the amino group which unites the two aryl radicles may be substituted by, e. g. a lower alkyl group. Preferably sulphonic acid and carboxylic acid groups are absent from the dyes when they are to be employed for the colouration of cellulose acetate or other materials which are relatively hydrophobic as compared with cotton, animal fibres and regenerated cellulose.

The carboxylic amide group may be a simple amide, an alkylamide, oxyalkylamide, aralkylamide, hydroarylamide, or arylamide or the amido nitrogen may form part of a heterocyclic ring, e. g. a piperidine ring. Especially noteworthy from the point of view of fastness to wet treatments are those dyes containing a carboxylic amide group in which the amido nitrogen is substituted by a radicle containing at least four carbon atoms, e. g. an aryl radicle, said radicle being preferably of the benzene series and advantageously being substituted by an alkoxy group.

Again, the carboxylic ester group may contain as the esterifying radicle an alkyl, oxyalkyl, hydroaryl, aralkyl or aryl. Advantageously, as in the case of the N-substituted carboxylic amides, the esterifying radicle contains at least four carbon atoms and may be, for example, an aryl radicle, especially suitable radicles being those of the benzene series.

It is preferable that all the cyclic radicles in the dyes should belong to the benzene series and that there should be no more than three such radicles present in the dye molecule.

Special mention may be made of the dyes of the general formula

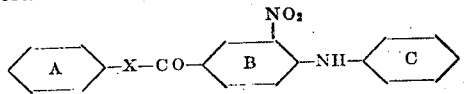

where X is —NH— or —O— and the nuclei A, B and C may carry alkyl or alkoxy substituents. The dyes of this general formula are of excellent fastness both to light and washing, in addition to being resistant to steaming.

Examples of dyes in accordance with the invention are the amide, dimethylamide, diethylamide, amylamide, anilide, hexahydro-anilide, o-anisidide and o-phenetidide of 2-nitro-diphenylamine-4-carboxylic acid, of 2-nitro-4'-methyl-diphenylamine-4-carboxylic acid, of 2-nitro-2'-methoxy-diphenylamine-4-carboxylic acid, of 2-nitrodiphenylamine-2'-carboxylic acid, of 2-nitrodiphenylamine-4'-carboxylic acid and of 4-nitrodiphenylamine-4'-carboxylic acid. Further examples are the isopropyl, benzyl, phenyl, phenylethyl, p-cresyl, o-anisyl, β-naphthyl and tetrahydrofurfuryl esters of the same carboxylic acids, the ethyl ester of N-(2'-nitro-4'-carboxyphenyl)-1-naphthylamine, and the amide of the last mentioned carboxylic acid.

The dyes of the invention are obtainable by amidating or esterifying the appropriate carboxylic acid or an appropriate reactive derivative, e. g. the acid chloride. For example, 2-nitro-diphenylamine-4-carboxylic acid, which can be prepared by condensing m-nitro-p-chloro-benzoic acid with aniline, can be converted into the acid chloride by means of thionyl chloride and then treated with ammonia or an organic amine, for example diethylamine, aniline, o-anisidine, cyclohexylamine or piperidine, or with an alcohol or a phenol. Instead of ammonia, a free amine, alcohol or phenol, a salt of any of these may be reacted with the acid or acid halide. Again the simple nitrodiarylamine carboxylic amide may be reacted with an alkylating, arylating, cycloalkylating or aralkylating agent to form the N-substituted derivative. Another method of producing the simple carboxylic amide is the hydrolysis of appropriate nitrile. Generally, it will be found most convenient to have the nitro group or groups present in the starting material, but if desired they may be introduced by nitration of the carboxylic amide or ester.

An alternative method which is available for the preparation of the dyes is the N-arylation of an appropriate aromatic amine. In such a case at least one of the two components involved in the reaction, i. e. the arylating agent or the aromatic amine, must contain a carboxylic amide or carboxylic ester group, and at least one of the components must contain a nitro group. Thus an appropriate reactive aryl halide may be condensed with an appropriate arylamine, e. g. the o-anisidide or the phenyl ester of m-nitro-p-chlorobenzoic acid may be condensed with aniline or with o or p-toluidine.

The new dyes can be applied to cellulose ester or ether materials in the form of aqueous dispersions or solutions in organic solvents. Bath methods can be employed, that is to say methods in which the materials are allowed to absorb the dye from a dispersion or solution of the latter in which they are immersed. Again mechanical impregnation methods can be used, the materials being impregnated with a solution or suspension of the requisite amount of the dye. To this end padding or printing methods may be utilised. The mechanically impregnated material can then be aged or steamed to cause the dye to enter the cellulose ester or ether material.

Those dyes of the present invention which are free from sulpho and carboxy groups have substantive affinity for cellulose esters or ethers, but in general substantially no affinity for cellulose or animal fibres. If, therefore, such a dye is applied to mixed materials containing both cellulose, e. g. cotton or regenerated cellulose, and a cellulose ester or ether, the latter alone takes up the dye and the cellulose component of the material remains uncoloured. By suitably colouring the cellulose component of such mixed material with dyestuffs resisting the cellulose ester or ether component of the materials solid shades or two colour effects can readily be obtained according to the components and dyes selected. The dyestuff for the cellulose portion can be applied before or after the application of the dye for the cellulose ester or ether portion.

The new dyes are also of value for colouring cellulose ester or ether solutions, especially lacquers and spinning solutions. By shaping and setting such coloured solutions in the form of fibres, straws, films and the like, valuable coloured products can be produced. For example, coloured cellulose acetate filaments can be produced by dry spinning such coloured solutions.

The invention, so far as its relates to the colouration of materials, is particularly concerned with the production of coloured cellulose acetate products. The new dyes may, however, be used for the production of coloured products of other cellulose esters, for example cellulose formate, propionate, butyrate or acetate-butyrate, or of cellulose ethers, for example methyl, ethyl or benzyl cellulose. The new dyes can also be used for the colouration of synthetic polymeric materials e. g. polyamide fibres, for example derived from hexamethylene diamine and adipic acid.

The invention is illustrated by the following examples, all parts being by weight:

EXAMPLE 1

*Phenyl ester of 2-nitro-diphenylamine-4-carboxylic acid*

A mixture of 100 parts m-nitro-p-chlorobenzoic acid, 850 parts aniline and 96 parts precipitated calcium carbonate is heated with stirring under reflux at 175–180° C. for 20 hours. On cooling, the product is poured into an excess of dilute hydrochloric acid and the dark product filtered and washed acid-free. It is purified by extraction with warm 5% caustic soda and 2-nitro-diphenylamine-4-carboxylic acid obtained as an orange powder on acidification of the filtrate.

50 parts of the 2-nitro-diphenylamine-4-carboxylic acid, 105 parts xylene and 24 parts thionyl chloride are gently boiled under reflux for one hour or till the evolution of hydrogen chloride has ceased. 19 parts phenol are then introduced and the solution boiled for a further one hour. On cooling, the crystalline phenyl ester is filtered, washed with a little xylene and dried.

The xylene filtrate on evaporation to half the volume gives a further crop of the ester.

It dyes cellulose acetate from an aqueous dispersion in pure yellow shades. By incorporating the finely divided dye in an acetone solution of cellulose acetate and dry spinning, yellow coloured filaments are produced.

The corresponding ethyl ester, which also dyes cellulose acetate in yellow shades, can be obtained by substituting ethyl alcohol for the phenol in the above preparation.

EXAMPLE 2

*The o-anisidide of 2-nitro-diphenylamine-4-carboxylic acid*

50 parts 2-nitro-diphenylamine-4-carboxylic acid, 430 parts xylene and 24 parts thionyl chloride are gently boiled under reflux for one hour. 25 parts o-anisidine are then introduced and the solution boiled for a further one hour. After filtering from a little o-anisidine hydrochloride the crystalline o-anisidide is separated from the cooled filtrate.

It dyes cellulose acetate in pure yellow shades slightly redder than those of the phenyl ester of 2-nitro-diphenylamine-4-carboxylic acid. By using ammonium carbonate or diethylamine in place of the o-anisidine the simple amide or the diethylamide of 2-nitro-diphenylamine-4-carboxylic acid is obtained. Both these dyes, like the o-anisidide, colour cellulose acetate in yellow shades.

EXAMPLE 3

*To dye 100 lb. of cellulose acetate fabric in a pure yellow shade*

The dye vessel, e. g. a winch machine, is set with 300 gallons of soft water, 1 to 3 lb. of soap, and, if desired, further additions of dispersing agents, e. g. Turkey red oil.

1 lb. of finely comminuted 2-nitro-diphenylamine-4-carboxylic acid phenyl ester in the form of a 10% aqueous paste is stirred with warm water containing a little soap or Turkey red oil and sieved into the dyebath, after which the fabric is entered and dyeing carried out for 1½ hours at 75° C. The material, which is coloured a pure yellow shade, is then rinsed, dried and finished as desired.

EXAMPLE 4

*To dye 100 lb. of cellulose acetate yarn a pure yellow shade*

A bark is set with 300 gallons of soft water, 3 lb. of soap and 3 lb. of Turkey red oil.

1 lb. of the o-anisidide of 2-nitro-diphenyl-amine-4-carboxylic acid, either in aqueous paste form or as a powder, is dispersed by warming with a little hot soap solution, sieved into the dyebath and the yarn entered and carefully turned for 1½ hours at a temperature of 75–80° C.

When dyeing is complete the yarn is rinsed and dried, whereby the cellulose acetate is coloured a pure yellow shade very fast to light.

Having described our invention what we desire to secure by Letters Patent is:

1. Textile material of an organic derivative of cellulose, colored with a compound selected from the group of esters and amides of a nitro-diarylamine mono carboxylic acid, said nitro-diarylamine carboxylic acid containing but two aryl nuclei and having the carboxylic group directly attached to one of the aryl nuclei.

2. Textile material of an organic derivative of cellulose, colored with a compound selected from the group of esters and amides of a nitro-diphenylamine mono carboxylic acid containing but two benzene nuclei, having the nitro group in ortho position to the amino group, and having the carboxylic group directly attached to one of the aryl nuclei.

3. Textile material of cellulose acetate, colored with a compound selected from the group of esters and amides of a nitro-diarylamine mono carboxylic acid, said nitro-diarylamine carboxylic acid containing but two aryl nuclei and having the carboxylic group directly attached to one of the aryl nuclei.

4. Textile material of cellulose acetate, colored with a compound selected from the group of esters and amides of a nitro-diphenylamine mono carboxylic acid containing but two benzene nuclei, having the nitro group in ortho position to the amino group, and having the carboxylic group directly attached to one of the aryl nuclei.

5. Textile material of cellulose acetate, colored with a compound selected from the group of esters and amides of 2-nitro-diphenylamine-4-carboxylic acid.

6. Textile material of cellulose acetate, colored with an aryl amide of 2-nitro-diphenylamine-4-carboxylic acid in which the aryl nucleus is that of benzene.

7. Textile material of cellulose acetate, colored with an aryl ester of 2-nitro-diphenylamine-4-carboxylic acid in which the aryl nucleus is that of benzene.

8. Textile material of cellulose acetate colored with the phenyl amide of 2-nitro-diphenylamine-4-carboxylic acid.

9. Textile material of cellulose acetate colored with the o-anisidide of 2-nitro-diphenylamine-4-carboxylic acid.

10. Textile material of cellulose acetate colored with the phenyl ester of 2-nitro-diphenylamine-4-carboxylic acid.

11. Process for the coloration of textile material of an organic derivative of cellulose which comprises applying thereto in an aqueous bath a compound selected from the group of esters and amides of a nitro-diarylamine monocarboxylic acid, said nitro-diarylamine carboxylic acid containing but two aryl nuclei and having the carboxylic group directly attached to one of the aryl nuclei.

12. Process for the coloration of textile material of cellulose acetate, which comprises applying thereto in an aqueous bath a compound selected from the group of esters and amides of a nitro-diarylamine monocarboxylic acid, said nitro-diarylamine carboxylic acid containing but two aryl nuclei and having the carboxylic group directly attached to one of the aryl nuclei.

HENRY CHARLES OLPIN.
CHRISTOPHER STANLEY ARGYLE.